(12) United States Patent
Yabu et al.

(10) Patent No.: US 12,394,803 B2
(45) Date of Patent: Aug. 19, 2025

(54) PRODUCTION METHOD OF CATALYST, CATALYST, PRODUCTION METHOD OF COMPOSITION, COMPOSITION, ELECTRODE, MANUFACTURING METHOD OF ELECTRODE, FUEL CELL, METAL-AIR BATTERY

(71) Applicant: Azul Energy Inc., Miyagi (JP)

(72) Inventors: Hiroshi Yabu, Sendai (JP); Koju Ito, Odawara (JP); Hiroya Abe, Sendai (JP); Koki Nakamura, Minamiashigara (JP)

(73) Assignee: AZUL Energy Inc., Miyagi (JP)

( * ) Notice: Subject to any disclaimer, the term of this patent is extended or adjusted under 35 U.S.C. 154(b) by 644 days.

(21) Appl. No.: 17/638,031

(22) PCT Filed: Sep. 2, 2020

(86) PCT No.: PCT/JP2020/033290
§ 371 (c)(1),
(2) Date: Feb. 24, 2022

(87) PCT Pub. No.: WO2021/045121
PCT Pub. Date: Mar. 11, 2021

(65) Prior Publication Data
US 2022/0278338 A1    Sep. 1, 2022

(30) Foreign Application Priority Data

Sep. 5, 2019 (JP) .................................. 2019-162370

(51) Int. Cl.
*H01M 4/90* (2006.01)
*H01M 4/88* (2006.01)
(Continued)

(52) U.S. Cl.
CPC ....... *H01M 4/9008* (2013.01); *H01M 4/8828* (2013.01); *H01M 4/9083* (2013.01); *H01M 12/06* (2013.01); *H01M 12/08* (2013.01)

(58) Field of Classification Search
CPC . B01J 31/183; B01J 31/22; B01J 37/02; B01J 37/08; B01J 2531/025;
(Continued)

(56) References Cited

FOREIGN PATENT DOCUMENTS

| CN | 103402633 A | 11/2013 |
|---|---|---|
| JP | S58186169 A | 10/1983 |

(Continued)

OTHER PUBLICATIONS

Machine translation of Taniguchi et al. (Year: 2014).*
(Continued)

*Primary Examiner* — Brian A McCaig
(74) *Attorney, Agent, or Firm* — Wood Herron & Evans LLP

(57) ABSTRACT

A catalyst having an excellent oxygen reduction catalytic ability, and showing excellent durability when used for an electrode for fuel cells and metal-air batteries; and a production method of a catalyst having an excellent oxygen reduction catalytic ability, and showing excellent durability when used for an electrode for fuel cells and metal-air batteries are provided. The production method of a catalyst includes: a step (a) of dissolving a metal complex in a solvent to prepare a solution; a step (b) of dispersing a conductive powder in the solution to prepare a dispersion liquid; and a step (c) of removing the solvent from the dispersion liquid, in which a complex is formed by adsorbing the metal complex on a surface of the conductive powder to use the complex as a catalyst.

19 Claims, 7 Drawing Sheets

(51) Int. Cl.
*H01M 12/06* (2006.01)
*H01M 12/08* (2006.01)

(58) Field of Classification Search
CPC ............ B01J 2531/842; B01J 2540/40; H01M 4/8657; H01M 4/8673; H01M 4/88; H01M 4/8828; H01M 4/8846; H01M 4/90; H01M 4/9008; H01M 4/9083; H01M 8/10; H01M 12/06; H01M 12/08; Y02E 60/50
See application file for complete search history.

(56) References Cited

FOREIGN PATENT DOCUMENTS

| | | | | |
|---|---|---|---|---|
| JP | 2006059578 | A | | 3/2006 |
| JP | 2012148225 | A | | 8/2012 |
| JP | 2013094771 | A | | 5/2013 |
| JP | 2014091061 | A | * 5/2014 | ............ B01J 37/16 |
| JP | 2015091578 | A | | 5/2015 |
| JP | 2016085925 | A | | 5/2016 |
| WO | 2006003943 | A1 | | 1/2006 |
| WO | 2019167407 | A1 | | 9/2019 |

OTHER PUBLICATIONS

Database Inspec [Online], The Institution of Electrical Engineers, Stevenage, GB; Jan. 21, 2017 (Jan. 21, 2017), Yang J et al: "Pristine carbon nanotube/iron phthalocyanine hybrids with a well-defined Nanostructure show excellent efficiency and durability for the oxygen reduction reaction", XP002812131, Database accession No. 17293874.
Database Inspec [Online], The Institution of Electrical Engineers, Stevenage, GB; Jun. 2013 (Jun. 2013), Hua-Zhang Zhao et al: "Electrodes modified with iron porphyrin and carbon nanotubes: application to CO2 reduction and mechanism of synergistic electrocatalysis", XP002812132, Database accession No. 14010647.
Fatemeh Ghani et al: "Solubility Properties of Unsubstituted Metal Phthalocyanines in Different Types of Solvents", Journal of Chemical and Engineering Data., vol. 57, No. 2, Jan. 27, 2012 (Jan. 27, 2012), pp. 439-449, XP055457405, US, ISSN: 0021-9568, DOI: 10.1021/je2010215.
European Patent Office, Search Report issued in EP20860034.6 dated Sep. 27, 2024.
Chinese Patent Office, Search Report issued in CN202080061456.2 dated Jul. 30, 2024.
PCT Office, International Search Report issued in PCT/JP2020/033290 mailed on Oct. 27, 2020.
Chinese Patent Office, Search Report issued in CN202080061456.2 dated Jun. 20, 2025 (with partial English Translation) 6 pages.

* cited by examiner

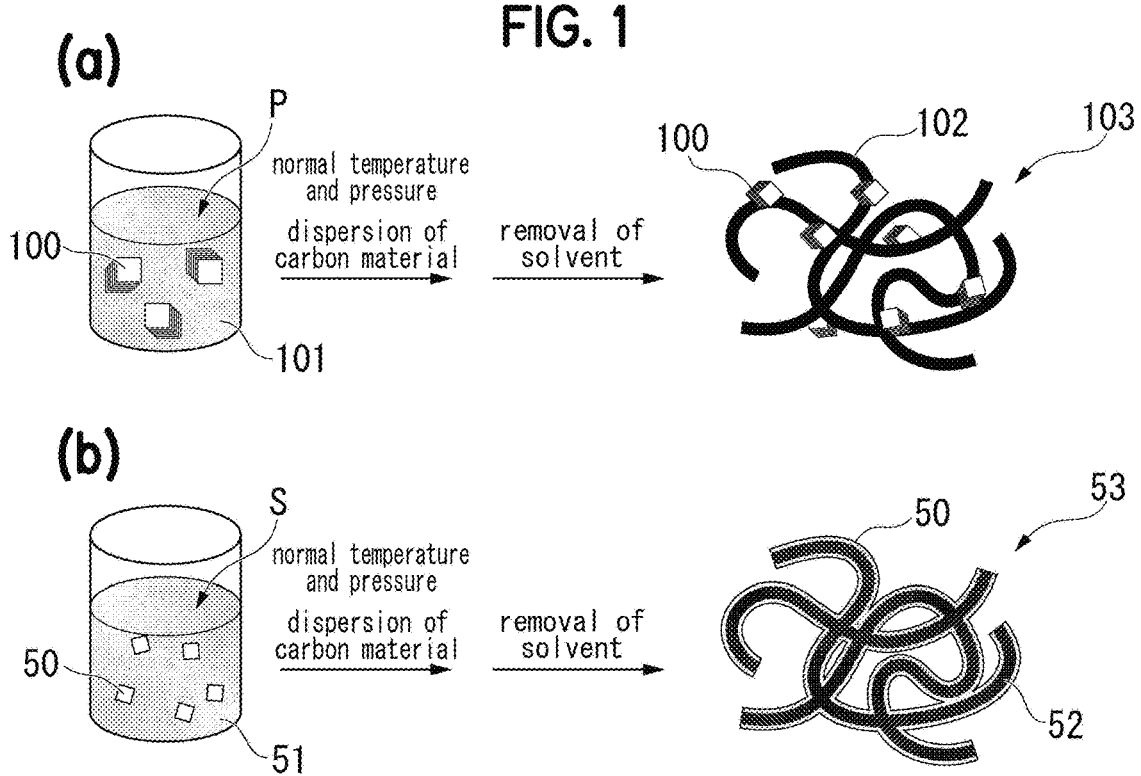
FIG. 1
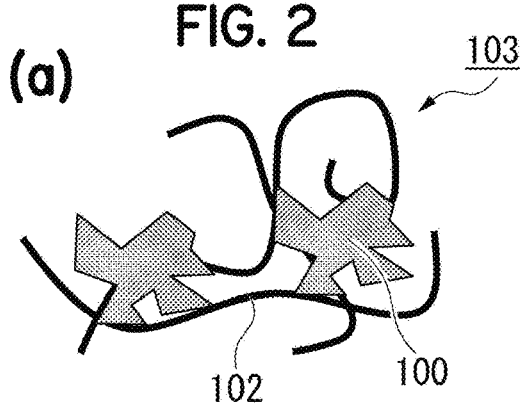
FIG. 2
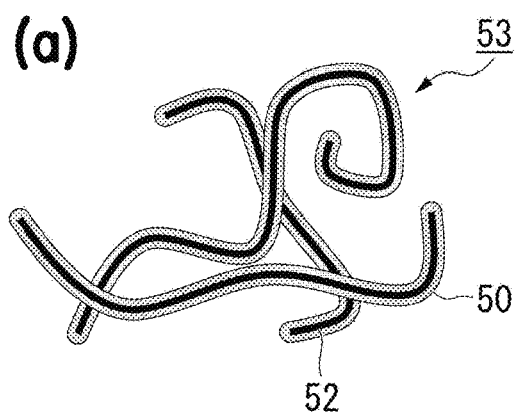

PRODUCTION METHOD OF CATALYST, CATALYST, PRODUCTION METHOD OF COMPOSITION, COMPOSITION, ELECTRODE, MANUFACTURING METHOD OF ELECTRODE, FUEL CELL, METAL-AIR BATTERY

TECHNICAL FIELD

The present invention relates to a production method of a catalyst, a catalyst, a production method of a composition, a composition, an electrode, a manufacturing method of an electrode, a fuel cell, and a metal-air battery.

BACKGROUND ART

Fuel cells and metal-air batteries that utilize an oxidation-reduction reaction (hereinafter, may be simply referred to as "fuel cells and the like") are known. In a fuel cell, a platinum-supporting carbon material is used as a catalyst for promoting the reduction reaction of oxygen. The platinum-supporting carbon material has an excellent function of promoting the reduction reaction of oxygen (oxygen reduction catalytic ability).

Meanwhile, in a metal-air battery, a manganese dioxide-supporting carbon material is used as the above-mentioned catalyst.

However, since platinum is expensive, and the amount of resources is limited, development of substitute materials for platinum-supporting carbon materials is being attempted. For example, a transition metal complex is used as a platinum alternative catalyst. As a typical example, Patent Document 1 discloses a catalyst for an air electrode in which iron phthalocyanine (Fe-Pc) is used. Example 1 of Patent Document 1 discloses a production method of a catalyst for air electrode in which an Fe-Pc dispersion liquid obtained by ball-milling treatment of iron phthalocyanine and 2-propanol is prepared, and a slurry obtained by mixing a conductive auxiliary agent, an auxiliary catalyst, a binder, and the like with the Fe-Pc dispersion liquid is dried to produce an air electrode mixture.

CITATION LIST

Patent Document

[Patent Document 1]
Japanese Unexamined Patent Application, First Publication No. 2016-85925

SUMMARY OF INVENTION

Technical Problem

Iron phthalocyanines have low solubility in 2-propanol. Therefore, in the method disclosed in Patent Document 1, the dispersion liquid in which iron phthalocyanine is dispersed in 2-propanol without dissolving iron phthalocyanine in 2-propanol is obtained, and crystals of iron phthalocyanine are present in the dispersion liquid. In the field of oxygen reduction catalysts of fuel cells and the like, it has been conventionally thought that the presence of iron phthalocyanine in a crystalline state contributes to the improvement of an oxygen reduction catalytic ability and durability in the case of an electrode. In addition, in the conventional art in which a dispersion liquid of a metal complex is used, enhancing the oxygen reduction catalytic ability and durability of a catalyst by increasing the concentration of a metal complex in a crystalline state was the general technical idea.

However, in the method disclosed in Patent Document 1, since crystals of iron phthalocyanine are present in the dispersion liquid, surface treatment with a conductive auxiliary agent such as carbon is insufficient due to iron phthalocyanine. Specifically, iron phthalocyanine is not molecularly adsorbed on the surface of carbon, and the interaction between iron phthalocyanine and carbon and the like cannot be sufficiently obtained. Accordingly, there is room for improvement in the oxygen reduction catalytic ability of the conventional oxygen reduction catalyst.

Furthermore, oxygen reduction catalysts of fuel cells and the like are required to have excellent durability when used for electrodes.

The present invention provides a catalyst having an excellent oxygen reduction catalytic ability, and showing excellent durability when used for an electrode for fuel cells and metal-air batteries; and a production method of a catalyst having an excellent oxygen reduction catalytic ability, and showing excellent durability when used for an electrode for fuel cells and metal-air batteries.

Solution to Problem

As a result of diligent studies, the inventors of the present invention have found that an oxygen reduction catalytic ability of a catalyst can be enhanced by using a solution of a metal complex in which a concentration of the metal complex is relatively low instead of a dispersion liquid of a metal complex.

That is, the present invention has the following aspects.

[1] A production method of a catalyst, the method including:
a step (a) of dissolving a metal complex in a solvent to prepare a solution;
a step (b) of dispersing a conductive powder in the solution to prepare a dispersion liquid; and
a step (c) of removing the solvent from the dispersion liquid,
in which a complex is formed by adsorbing the metal complex on a surface of the conductive powder to use the complex as a catalyst.

[2] The production method of a catalyst according to [1], in which a concentration of the metal complex in the solution is 0.0001 to 5 g/L.

[3] The production method of a catalyst according to [1] or [2], in which the complex is used as a catalyst without being subjected to heat treatment at 200° C. or higher.

[4] The production method of a catalyst according to any one of [1] to [3], in which the step (a) and the step (b) are performed at a temperature equal to or lower than a boiling point of the solvent.

[5] The production method of a catalyst according to any one of [1] to [4], in which the step (a) and the step (b) are performed at a temperature equal to or lower than 80° C.

[6] The production method of a catalyst according to any one of [1] to [5], in which the metal complex is adsorbed on the surface of the conductive powder at a temperature equal to or lower than a boiling point of the solvent.

[7] The production method of a catalyst according to any one of [1] to [6], in which the solvent is removed by filtering the dispersion liquid.

[8] The production method of a catalyst according to [7], in which an absorbance of a filtrate after filtration is reduced by 10% or more as compared to that of the solution.

[9] The production method of a catalyst according to any one of [1] to [8], in which a solubility of the metal complex in the solvent is 0.1 g/L or more.

[10] The production method of a catalyst according to any one of [1] to [9], in which the metal complex is a metal complex represented by Formula (1),

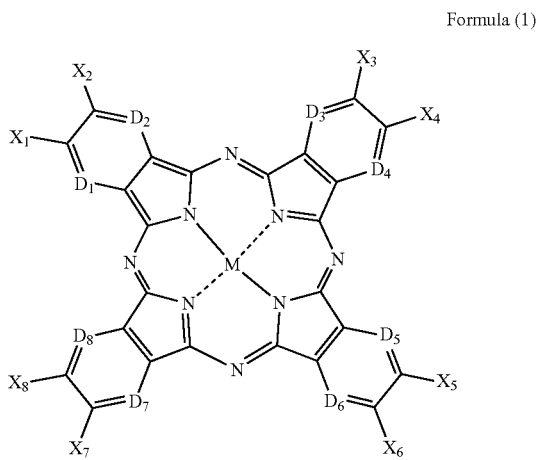

Formula (1)

in Formula (1), $X_1$ to $X_8$ are each independently a hydrogen atom or a halogen atom, $D_1$ to $D_8$ are each independently a nitrogen atom or a carbon atom, a hydrogen atom or a halogen atom is bonded to the carbon atom, and M is a metal atom.

[11] The production method of a catalyst according to any one of [1] to [10], in which the metal complex is a metal complex represented by Formula (11),

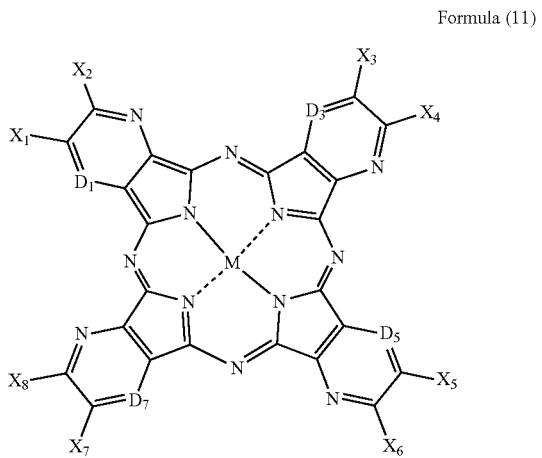

Formula (11)

in Formula (11), $X_1$ to $X_8$ are each independently a hydrogen atom or a halogen atom, $D_1$, $D_3$, $D_5$, and $D_7$ are each independently a nitrogen atom or a carbon atom, at least one of $D_1$, $D_3$, $D_5$, and $D_7$ is a carbon atom, a hydrogen atom or a halogen atom is bonded to the carbon atom, and M is a metal atom.

[12] The production method of a catalyst according to any one of [1] to [11], in which a solubility parameter of the solvent is 10 to 20 $(MPa)^{1/2}$.

[13] The production method of a catalyst according to any one of [1] to [12], in which the solvent is at least one selected from the group consisting of dimethyl sulfoxide and N,N-dimethylformamide.

[14] The production method of a catalyst according to any one of [1] to [13], in which the conductive powder is at least one selected from the group consisting of a carbon material, a metal material, and a metal oxide material.

[15] A catalyst which is obtained by the production method of a catalyst according to any one of [1] to [14].

[16] A production method of a composition, the method including:
a step (a) of dissolving a metal complex in a solvent to prepare a solution;
a step (b) of dispersing a conductive powder in the solution to prepare a dispersion liquid; and
a step (c) of removing the solvent from the dispersion liquid,
in which a complex is formed by adsorbing the metal complex on a surface of the conductive powder to use the complex as a catalyst, and
the method further includes a step (d) of mixing the catalyst and a liquid medium.

[17] A composition containing: the catalyst obtained by the production method of a catalyst according to any one of [1] to [14]; and a liquid medium.

[18] An electrode containing the catalyst obtained by the production method of a catalyst according to any one of [1] to [14].

[19] A manufacturing method of an electrode, the method including:
a step (a) of dissolving a metal complex in a solvent to prepare a solution;
a step (b) of dispersing a conductive powder in the solution to prepare a dispersion liquid; and
a step (c) of removing the solvent from the dispersion liquid,
in which a complex is formed by adsorbing the metal complex on a surface of the conductive powder to use the complex as a catalyst, and
the method further includes:
a step (d) of mixing the catalyst and a liquid medium; and
a step (e) of applying a mixture of the catalyst and the liquid medium to a surface of a base material and removing the liquid medium.

[20] A fuel cell including the electrode according to [18].

[21] A metal-air battery including the electrode according to [18].

Advantageous Effects of Invention

According to the present invention, a catalyst having an excellent oxygen reduction catalytic ability, and showing excellent durability when used for an electrode for fuel cells and metal-air batteries; and a production method of a catalyst having an excellent oxygen reduction catalytic ability, and showing excellent durability when used for an electrode for fuel cells and metal-air batteries are provided.

BRIEF DESCRIPTION OF DRAWINGS

FIG. 1 is a schematic diagram for explaining a production method of a catalyst of the present invention in comparison with a conventional method.

FIG. 2 is a schematic diagram for explaining a catalyst obtained by the production method of the present invention in comparison with a catalyst obtained by the conventional method.

DESCRIPTION OF EMBODIMENTS

Figure 3:
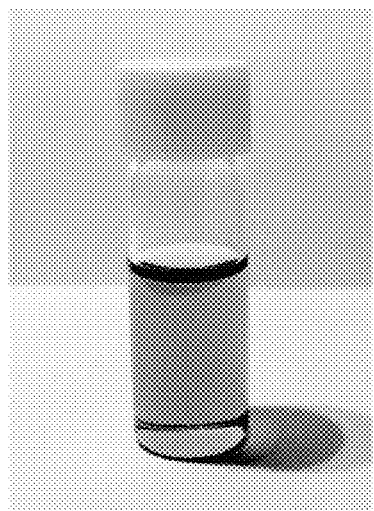
FIG. 3 is a photograph showing a solution used in Example 1 in which FeTPP was dissolved in DMSO.

In the present specification, a metal complex represented by Formula (1) is referred to as a metal complex (1). Metal complexes represented by other formulas are also described in the same manner.

A "heteroatom" means an atom other than a carbon atom and a hydrogen atom.

The term "to" indicating a numerical value range means that numerical values described before and after the term are included as the lower limit value and the upper limit value.

<Production Method of Catalyst>

A production method of a catalyst of the present invention includes the following step (a), step (b), and step (c). In the production method of a catalyst of the present invention, a complex is formed by adsorbing the metal complex on a surface of a conductive powder to use the complex as a catalyst.

Step (a): A step of dissolving a metal complex in a solvent to prepare a solution.

Step (b): A step of dispersing a conductive powder in the solution to prepare a dispersion liquid.

Step (c): A step of removing the solvent from the dispersion liquid.

(Step (a))

In the step (a), a metal complex is dissolved in a solvent to prepare a solution (S). The solution (S) contains a metal complex and a solvent in which the metal complex is dissolved. The conditions such as a temperature and a pressure when preparing the solution are not particularly limited as long as they are conditions in which the metal complex can be dissolved in the solvent.

For example, the temperature when preparing the solution is preferably a temperature equal to or lower than the boiling point of the solvent. The solution is usually prepared at room temperature (for example, 25° C.). When preparing the solution, the solution is usually prepared under atmospheric pressure.

The metal complex will be described.

Specific examples of the metal complex include an iron complex and a cobalt complex. However, the metal complex may be a transition metal complex, a lanthanoid metal complex, an actinoid metal complex, or the like other than the above examples, and the metal complex is not limited to an iron complex or a cobalt complex.

The metal complex in the present invention is preferably a metal complex (1) represented by Formula (1). The metal complex (1) has an advantage that it is useful as a substitute material for platinum. In particular, four nitrogen atoms coordinated around a metal atom M constitute a part of a pyridine ring structure. It is thought that these four nitrogen atoms constituting the part of the pyridine ring structure contribute to excellent solubility in a solvent.

Formula (1)

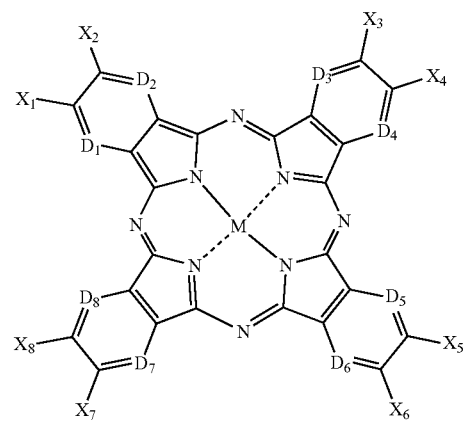

In Formula (1), $X_1$ to $X_8$ are each independently a hydrogen atom or a halogen atom, $D_1$ to $D_8$ are each independently a nitrogen atom or a carbon atom, a hydrogen atom or a halogen atom is bonded to the carbon atom, and M is a metal atom.

Examples of the metal complex (1) include the following metal complex (11), metal complex (12), and metal complex (13).

Formula (11)

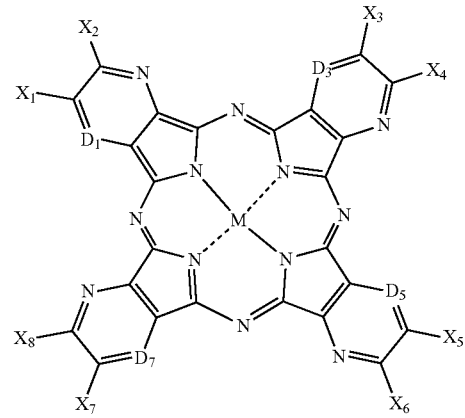

In Formula (11), $X_1$ to $X_8$ are each independently a hydrogen atom or a halogen atom, $D_1$, $D_3$, $D_5$, and $D_7$ are each independently a nitrogen atom or a carbon atom, at least one of $D_1$, $D_3$, $D_5$, and $D_7$ is a carbon atom, a hydrogen atom or a halogen atom is bonded to the carbon atom, and M is a metal atom.

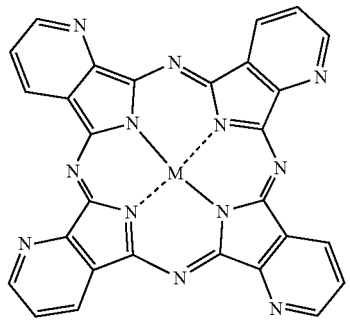

Formula (11-1)

In Formula (11-1), M is a metal atom.

Specific examples of the metal complex (12) include the following metal complex (12-1). However, specific examples of the metal complex (12) are not limited to this example.

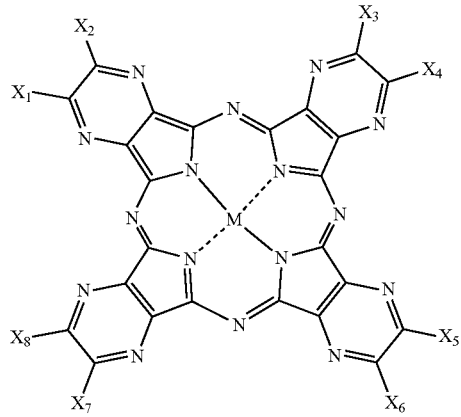

Formula (12)

In Formula (12), $X_1$ to $X_8$ are each independently a hydrogen atom or a halogen atom, and M is a metal atom.

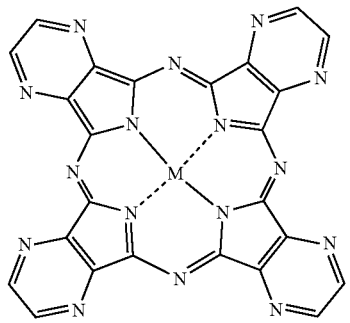

Formula (12-1)

In Formula (12-1), M is a metal atom.

Specific examples of the metal complex (13) include the following metal complex (13-1). However, specific examples of the metal complex (13) are not limited to this example.

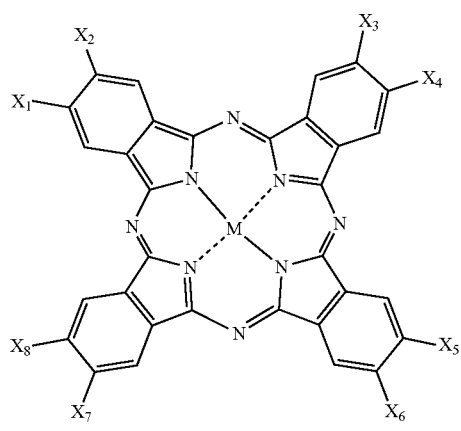

Formula (13)

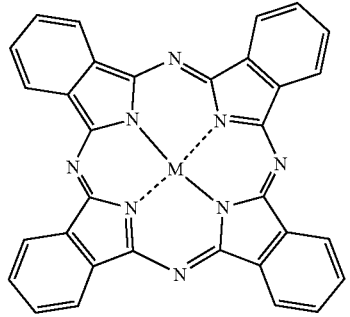

Formula (13-1)

In Formula (13), $X_1$ to $X_8$ are each independently a hydrogen atom or a halogen atom, and M is a metal atom.

Specific examples of the metal complex (11) include the following metal complex (11-1). However, specific examples of the metal complex (11) are not limited to this example.

In Formula (13-1), M is a metal atom.

Among the metal complex (11), the metal complex (12), and the metal complex (13), the metal complex (11) is preferable because an oxygen reduction catalytic ability tends to be improved. In addition, use of the metal complex (11) tends to improve a solubility in a solvent. As a result, affinity for the conductive powder is improved, and the metal complex is likely to be uniformly adsorbed on the surface of the conductive powder.

In the metal complex (1), for example, isomers such as the following metal complex (11-1') and the following metal complex (12-1') may be present.

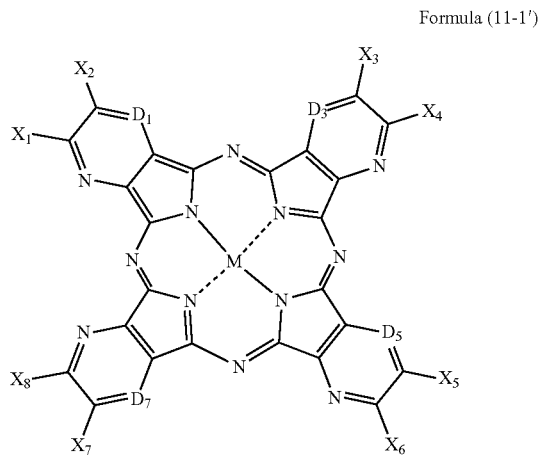

Formula (11-1')

In Formula (11-1'), $X_1$ to $X_8$ are each independently a hydrogen atom or a halogen atom, $D_1$, $D_3$, $D_5$, and $D_7$ are each a nitrogen atom or a carbon atom, at least one of $D_1$, $D_3$, $D_5$, and $D_7$ is a carbon atom, a hydrogen atom or a halogen atom is bonded to the carbon atom, and M is a metal atom.

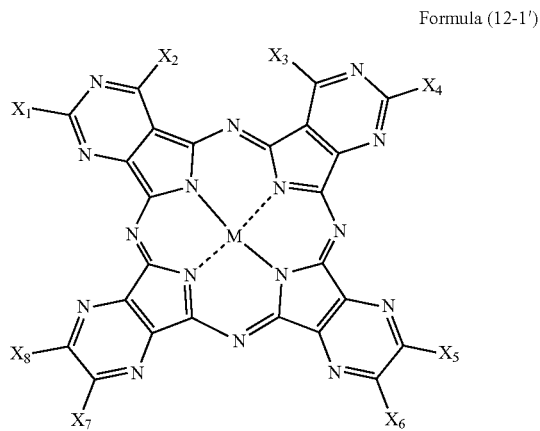

Formula (12-1')

In Formula (12-1'), $X_1$ to $X_8$ are each independently a hydrogen atom or a halogen atom, and M is a metal atom.

In the present invention, the metal complex is a concept including isomers as shown in Formula (11-1') above, Formula (12-1') above, and the like. The isomers of the metal complex is not limited to those shown in Formula (11-1') above and Formula (12-1') above. For example, in Formula (11-1') above, in at least one selected from each of cyclic structures containing each of $D_1$, $D_3$, $D_5$, and $D_7$, the position of a nitrogen atom may be exchanged within the same cyclic structure as the positions of any of $D_1$, $D_3$, $D_5$, and $D_7$.

Hereinafter, aspects of the metal complex (1) will be described in more detail, but in any of the aspects, isomers as shown in Formula (11-1') or Formula (12-1') may be present. All of these isomers are included in the aspects of the metal complex of the present invention.

In the metal complex (1), M is a metal atom.

The bond between the nitrogen atom and M means the coordination of the nitrogen atom to M. A halogen atom, a hydroxyl group, and a hydrocarbon group having 1 to 8 carbon atoms may be further bonded to M as a ligand. In addition, anionic counterions may be present for electrical neutrality.

The valence of M is not particularly limited. For the metal complex to be electrostatically neutral, a halogen atom, a hydroxyl group, or an alkyloxy group having 1 to 8 carbon atoms may be bonded as a ligand (for example, an axial ligand), or anionic counterions may be present. Examples of the anionic counterions include a halide ion, a hydroxide ion, a nitrate ion, and a sulfate ion.

The structure of an alkyl group contained in the alkyloxy group having 1 to 8 carbon atoms may be linear, branched, or cyclic.

Example of the above-mentioned M include scandium atom, titanium atom, vanadium atom, chromium atom, manganese atom, iron atom, cobalt atom, nickel atom, copper atom, zinc atom, yttrium atom, zirconium atom, niobium atom, ruthenium atom, rhodium atom, palladium atom, lanthanum atom, cerium atom, praseodymium atom, neodymium atom, promethium atom, samarium atom, europium atom, gadolinium atom, terbium atom, dysprosium atom, holmium atom, erbium atom, thulium atom, ytterbium atom, lutetium atom, actinium atom, thorium atom, protactinium atom, uranium atom, neptunium atom, plutonium atom, americium atom, curium atom, berkelium atom, californium atom, einsteinium atom, fermium atom, mendelevium atom, nobelium atom, and lawrencium atom.

Among these, iron atom, manganese atom, cobalt atom, copper atom, and zinc atom are preferable; iron atom, manganese atom, and cobalt atom are more preferable; and iron atom is particularly preferable.

When M is an iron atom, because four nitrogen atoms coordinated around the iron atom constitute a part of a pyridine ring structure, a $FeN_4$ structure having these four nitrogen atoms and the iron atom in a molecule of the metal complex is locally formed. When this $FeN_4$ structure is formed, the oxygen reduction catalytic ability of the catalyst is further improved.

When M is an iron atom, specific examples of the metal complex (1) include the following metal complex (11-1-1), metal complex (12-1-1), and metal complex (13-1-1). However, specific examples of the metal complex (1) in which M is an iron atom are not limited to these examples.

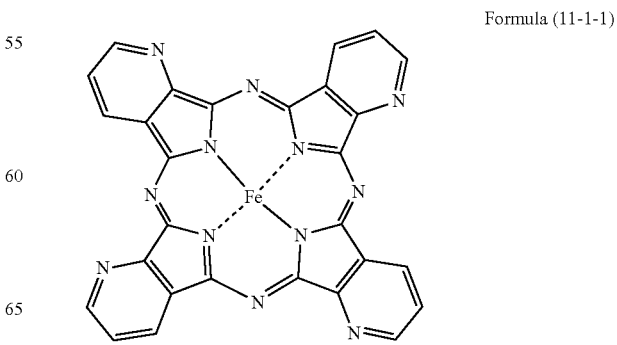

Formula (11-1-1)

-continued

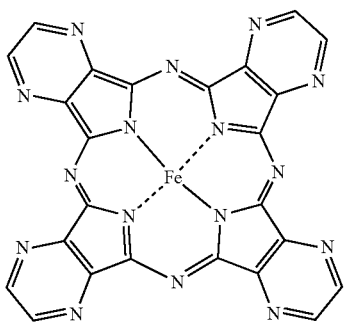

Formula (12-1-1)

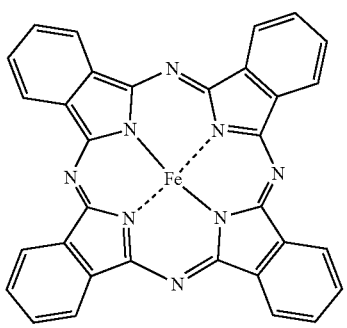

Formula (13-1-1)

The solubility of the metal complex in a solvent is mainly determined by selection of a combination of a metal complex and a compound serving as a solvent. For example, when a metal complex is the metal complex (1), the solubility of the metal complex (1) in a solvent can be adjusted by changing the number of atoms, which are nitrogen atoms, among $D_1$ to $D_8$ in the structure of the metal complex (1). Accordingly, affinity between the conductive powder and the metal complex can be enhanced, and the oxygen reduction catalytic ability can be further enhanced.

The solvent will be described.

The solvent is not particularly limited as long as it is a compound in which the metal complex can be dissolved. A compound in which the solubility of the metal complex is 0.1 g/L or more is preferable.

The solubility of the metal complex is preferably 0.1 g/L or more, more preferably 0.4 g/L or more, further preferably 2.0 g/L or more, and particularly preferably 10 g/L or more. The upper limit value of the solubility of the metal complex (1) is not particularly limited. The upper limit value of the solubility of the metal complex (1) may be 20 g/L, may be 50 g/L, or may be 100 g/L, for example.

When the solubility of the metal complex is equal to or more than the above-mentioned lower limit value, the metal complex is more likely to be dissolved in the solvent, and the metal complex is more likely to be uniformly adsorbed on the surface of the conductive powder. As a result, the oxygen reduction catalytic ability of the catalyst is further improved, and the durability in the case of an electrode of a fuel cell is further improved.

The solubility of the metal complex in the solvent is usually the maximum value of the dissolved amount (g) of the metal complex per 1 L of the solvent measured at 25° C. under atmospheric pressure by using ultraviolet-visible spectroscopy. In addition, the conditions for measuring the solubility of the metal complex in the solvent are conditions specified regardless of the conditions when preparing the solution.

A solubility parameter of the solvent is preferably 10 to 20 $(MPa)^{1/2}$, and more preferably 11 to 13 $(MPa)^{1/2}$. When the solubility parameter of the solvent is less than the above-mentioned lower limit value, hydrophobicity tends to be too high, and the solubility of the metal complex having a polar portion tends to decrease. When the solubility parameter of the solvent is more than the above-mentioned upper limit value, polarity tends to be too high, and the solubility of the metal complex having a hydrophobic portion tends to decrease.

The solubility parameter of the solvent can be estimated as an SP value by a Fedors method, for example.

The concentration of the metal complex in the solution is preferably 0.0001 to 5 g/L, more preferably 0.01 to 1 g/L, and preferably 0.1 to 1 g/L.

When the concentration of the metal complex is equal to or more than the above-mentioned lower limit value, the adsorption efficiency of the metal complex is further improved, an adsorption rate is increased, and productivity is improved.

When the concentration of the metal complex is equal to or less than the above-mentioned upper limit value, the metal complex in the solution is likely to be uniformly adsorbed on the surface of the conductive powder, and a uniform monomolecular layer consisting of a single molecule of the metal complex is formed on the surface of the conductive powder. As a result, the effect of further improving the oxygen reduction catalytic ability and durability of the catalyst of the present invention can be obtained.

In the conventional art in which a dispersion liquid of a metal complex has been used, enhancing the oxygen reduction catalytic ability of a catalyst by increasing the concentration of a metal complex in a crystalline state was the general technical idea. On the other hand, according to the production method of a catalyst of the present invention, the solution in which the concentration of the metal complex is relatively low is used. As described above, the technical idea of enhancing the oxygen reduction catalytic ability of the catalyst by using the solution in which the concentration of the metal complex is relatively low was found by the inventors of the present invention.

The concentration of the metal complex can be measured based on an extinction coefficient and a molar extinction coefficient by a spectrophotometer, for example.

The solution may further contain impurities other than the metal complex. In this case, the content of the impurities is preferably 20% by mass or less with respect to 100% by mass of the content of the metal complex. When the content of the impurities is equal to or less than the above-mentioned upper limit value, the metal complex can be more efficiently adsorbed on the conductive powder.

The solvent can be appropriately selected depending on the metal complex. For example, specific examples of the solvent include alcohols such as methanol, ethanol, and hexafluoro-2-propanol; dimethyl sulfoxide; aprotic polar solvents such as N-methylpyrrolidone, dimethylformamide, and acetone; and non-polar solvents such as chloroform, dichloromethane, and 1,4-dioxane. However, specific examples of the solvent are not limited to these examples.

As the solvent, one kind may be used alone, or two or more kinds may be used in combination. That is, the solvent may be composed of only a single component or may be a mixed solvent.

For example, when the above-mentioned metal complex (11), metal complex (12), and metal complex (13) are used as the metal complex, the solvent is preferably at least one selected from the group consisting of dimethyl sulfoxide and N,N-dimethylformamide. As an example, the solubility of the metal complex (11-1-1), the metal complex (12-1-1), and the metal complex (13-1-1) in each of dimethyl sulfoxide, N,N-dimethylformamide, and tetrahydrofuran at 25° C. under atmospheric pressure is shown in Table 1 below.

TABLE 1

|  | DMSO | DMF | THF |
| --- | --- | --- | --- |
| Solubility of metal complex (11-1-1) [g/L] | 0.80 | 0.46 | 0.018 |
| Solubility of metal complex (12-1-1) [g/L] | 1.0 | Not dissolved | Not dissolved |
| Solubility of metal complex (13-1-1) [g/L] | 0.45 | 0.45 | 0.049 |

In Table 1, the column "DMSO" shows the solubility of each of the metal complexes in dimethyl sulfoxide at 25° C. and atmospheric pressure.

In Table 1, the column of "DMF" shows the solubility of each of the metal complexes in N,N-dimethylformamide at 25° C. and atmospheric pressure.

In Table 1, the column "THF" shows the solubility of each of the metal complexes in tetrahydrofuran at 25° C. and atmospheric pressure.

Each solubility shown in Table 1 was measured by a method described in Examples to be described later.

(Step (b))

In the step (b), the conductive powder is dispersed in the solution to prepare a dispersion liquid.

Usually, in the step (b), a complex is formed and used as a catalyst by adsorbing the metal complex on the surface of the conductive powder. The dispersion liquid contains the catalyst in which the metal complex is adsorbed on the surface of the conductive powder.

The temperature when preparing the dispersion liquid is preferably a temperature equal to or lower than the boiling point of the solvent. The dispersion liquid is usually prepared at room temperature (for example, 25° C.).

The temperature when adsorbing the metal complex on the surface of the conductive powder is preferably a temperature equal to or lower than the boiling point of the solvent. The dispersion liquid is usually prepared at room temperature (for example, 25° C.).

The conductive powder will be described.

The conductive powder is not particularly limited as long as it can be dispersed in a solvent and has conductivity. Examples of the conductive powder include at least one selected from the group consisting of carbon materials, metal materials, and metal oxide materials. Among these, a carbon material is preferable as the conductive powder. As the conductive powder, one kind may be used alone, or two or more kinds may be used in combination.

Specific examples of the carbon materials include graphite, amorphous carbon, activated carbon, graphene, carbon black, carbon fibers, mesocarbon microbeads, microcapsule carbon, fullerene, carbon nanofoams, carbon nanotubes, and carbon nanohorns. Among these, graphite, amorphous carbon, activated carbon, graphene, carbon black, carbon fibers, fullerene, and carbon nanotubes are preferable; carbon nanotubes, carbon black, and graphene are more preferable; and carbon nanotubes and graphene are further preferable.

Specific examples of the metal materials include titanium and tin.

Specific examples of the metal oxide materials include titanium oxide and tin oxide ($SnO_2$, ITO, ATO).

Examples of the carbon nanotubes include single-walled carbon nanotubes, double-walled carbon nanotubes, and multi-walled carbon nanotubes. Among these, from the viewpoint of excellent conductivity of the catalyst, double-walled carbon nanotubes and multi-walled carbon nanotubes are preferable, and multi-walled carbon nanotubes are further preferable.

The carbon material may have a functional group such as a hydroxyl group, a carboxyl group, a nitrogen-containing group, a silicon-containing group, a phosphorus-containing group such as a phosphoric acid group, and a sulfur-containing group such as a sulfonic acid group. Among these, the carbon material preferably has a carboxyl group. When the carbon material has a carboxyl group, the metal complex is likely to be adsorbed on the surface of the carbon material, the durability in the case of an electrode is further improved, and the oxygen reduction catalytic ability is further improved.

The carbon material may have a heteroatom. Examples of the heteroatom include an oxygen atom, a nitrogen atom, a phosphorus atom, a sulfur atom, and a silicon atom. In the case in which the carbon material has a heteroatom, the carbon material may be contain one kind of heteroatom alone or may contain two or more kinds of heteroatoms. The carbon material may be oxidized, may be hydroxylated, may be nitrided, may be phosphorylated, may be sulfided, or may be silicified.

When the carbon material contains a carboxyl group, the content of the carboxyl group is preferably 20% by mass or less, more preferably 15% by mass or less, and further preferably 10% by mass or less, with respect to 100% by mass of the carbon material. When the content of the carboxyl group is equal to or less than the above-mentioned upper limit value, production cost of the catalyst is likely to decrease.

When the carbon material contains a carboxyl group, the content of the carboxyl group is preferably 1% by mass or more, more preferably 5% by mass or more, and further preferably 8% by mass or more. When the content of the carboxyl group is equal to or more than the above-mentioned lower limit value, the durability and the oxygen reduction catalytic ability in the case of an electrode are further improved.

The content of the carboxyl group can be measured by elemental analysis, X-ray photoelectron spectroscopy, or the like.

From the viewpoint of excellent conductivity of the catalyst and further excellent oxygen reduction catalytic ability, the carbon material is preferably a double-walled carbon nanotube having a carboxyl group or a multi-walled carbon nanotube having a carboxyl group, and is more preferably a multi-walled carbon nanotube having a carboxyl group.

The specific surface area of the carbon material is preferably $0.8 \text{ m}^2/\text{g}$ or more, more preferably $1.0 \text{ m}^2/\text{g}$ or more, further preferably $1.1 \text{ m}^2/\text{g}$ or more, particularly preferably $1.5 \text{ m}^2/\text{g}$ or more, and most preferably $2.0 \text{ m}^2/\text{g}$ or more. When the specific surface area is $0.8 \text{ m}^2/\text{g}$ or more, aggregation of the catalyst is likely to be prevented, and the oxygen reduction catalytic ability of the catalyst is further excellent. The upper limit value of the specific surface area is not particularly limited. The upper limit value of the specific surface area can be $2000 \text{ m}^2/\text{g}$, for example.

The specific surface area can be measured by a nitrogen adsorption BET method with a specific surface area measuring device.

The average particle size of the conductive powder is not particularly limited. The average particle size of the conductive powder is preferably 5 nm to 1000 µm, for example. Examples of methods for adjusting the average particle size of the conductive powder within the above-mentioned numerical value range include the following methods (α1) to (α3).

Method (α1): A method in which particles are pulverized by a ball mill or the like, the obtained coarse particles are dispersed in a dispersant to obtain a desired particle size, and thereafter the particles are dried.

Method (α2): A method in which particles are pulverized by a ball mill or the like, and the obtained coarse particles are sieved or the like to sort out particle sizes.

Method (α3): A method in which the production conditions of the conductive powder are optimized when producing the conductive powder, and the particle size of particles are adjusted.

The average particle size of the conductive powder can be measured with a particle size distribution measuring device, an electron microscope, or the like.

In one aspect of the production method of a catalyst of the present invention, a dispersion liquid is prepared by dispersing the conductive powder in the solution (S). The solution (S) contains a metal complex and a solvent in which the metal complex is dissolved.

A method for dispersing the conductive powder in the solution (S) is not particularly limited. For example, the following methods (β1) and (β2) are exemplary examples.

Method (β1): A method in which the solution (S) and the conductive powder are mixed, and the obtained mixed solution is subjected to stirring treatment.

Method (β2): A method in which the solution (S) and the conductive powder are mixed, and the obtained mixed solution is subjected to dispersion treatment using a disperser such as a homogenizer.

In the method (β1), examples of the stirring treatment include use of a mixer, irradiation with ultrasonic waves, stirring with a magnetic stirrer, and stirring with a stirrer. However, the stirring treatment is not limited to these examples.

A method for removing the solvent from the dispersion liquid is not particularly limited. For example, filtration such as solid-liquid separation; drying under reduced pressure; and heat-drying are exemplary examples. However, in the case of heat-drying, when considering durability when the catalyst is used for an electrode, a lower heating temperature is preferable, and specifically, 200° C. or lower is preferable, 100° C. or lower is more preferable, and 50° C. or lower is further preferable.

(Step (c))

In the step (c), the solvent is removed from the above-mentioned dispersion liquid to obtain a complex, in which the metal complex is adsorbed on the surface of the conductive powder, as a catalyst.

A method for removing the solvent from the dispersion liquid is not particularly limited. For example, removal can be performed by solid-liquid separation. As the solid-liquid separation, filtration is preferable because the temperature load on the catalyst is reduced. That is, it is preferable to remove the solvent by filtering the dispersion liquid. At the time of the filtration, it is preferable that the absorbance of a filtrate after the filtration be reduced by 10% or more as compared to the above-mentioned solution. Accordingly, it is thought that it is possible to determine that the metal complex is effectively adsorbed on the conductive powder.

In the present invention, the conductive powder is dispersed in the solution (S). Therefore, molecules of the metal complex can be molecularly and uniformly adsorbed on the surface of the conductive powder. As a result, catalyst molecules can be produced as a complex having the conductive powder and the metal complex adsorbed in a layer shape on the surface of the conductive powder.

In the present invention, it is preferable to use the complex, which has the conductive powder and the metal complex adsorbed in a layer shape on the surface of the conductive powder, as a catalyst without subjecting the complex to heat treatment at 200° C. or higher; it is more preferable to use the complex as a catalyst without subjecting the complex to heat treatment at 100° C. or higher; and it is further preferable to use the complex as a catalyst without subjecting the complex to heat treatment at 50° C. or higher.

Conventionally, in a production method of a catalyst, it has been common to perform heat treatment such as firing in order to support metal atoms on the surface of a carbon material. In addition, it has been considered important to perform heat treatment such as firing in order to also support metal atoms, nitrogen atoms, or the like on a carbon material.

On the other hand, in the present invention, attention has been paid to increasing the solubility of the metal complex in the solvent to increase the affinity of the metal complex for the carbon material without performing heat treatment which was conventionally considered to be important in the production of a catalyst. By increasing the solubility of the metal complex in the solvent to increase the affinity of the metal complex for the carbon material, it is possible to provide a complex layer of the metal complex adsorbed in a single molecular state on the surface of the carbon material. As a result, a similar or higher level of an oxygen reduction catalytic ability than that of a platinum-supporting carbon material can be obtained.

In the production method of a catalyst of the present invention, each of the step (a) and the step (b) may be an independent step, or the step (a) and the step (b) may be simultaneous or integrated steps. When the step (a) and the step (b) are carried out simultaneously or integrally, adsorption of the metal complex to the conductive powder is further promoted when the solubility of the metal complex is relatively low.

The step (a) and the step (b) are preferably performed at the temperature equal to or lower than the boiling point of the solvent, preferably at the temperature of 80° C. or lower, for example. Accordingly, the temperature load on the catalyst is reduced, which is desirable from the viewpoint of reducing the production cost.

(Action Effect)

In the production method of a catalyst of the present invention described above, since the solution containing the solvent in which the metal complex is dissolved is used, the metal complex is dissolved in the solvent in the solution. Therefore, crystals of the metal complex are less likely to be present in the solution, and molecules of the metal complex are uniformly adsorbed on the surface of the conductive powder. By using the complex in which the metal complex is molecularly adsorbed on the surface of the conductive powder as a catalyst as described above, the efficiency of electron transfer between the metal complex and the conductive powder is improved, and thereby the oxygen reduction catalytic ability of the catalyst is improved.

In addition, as described in Examples to be described later, even when the metal complex is dissolved in the solvent, it is possible to obtain the catalyst having excellent durability when used for an electrode of a fuel cell.

FIG. 1 is a schematic diagram for explaining a production method of a catalyst of the present invention in comparison with a conventional method. (a) of FIG. 1 is a schematic diagram showing a conventional method. (b) of FIG. 1 is a schematic diagram showing a production method of a catalyst of the present invention.

FIG. 2 is a schematic diagram for explaining a catalyst obtained by the production method of the present invention in comparison with a catalyst obtained by the conventional method. (a) of FIG. 2 is a schematic diagram showing a catalyst obtained by the conventional method. (b) of FIG. 2 is a schematic diagram showing a catalyst obtained by the production method of the present invention.

Conventionally, as shown in (a) of FIG. 1, in anticipation of improvement in durability in the case of an electrode of a fuel cell, it was customary to use a dispersion liquid P, in which crystals 100 of a metal complex are dispersed in a liquid medium 101, to produce a catalyst 103. Therefore, the crystals 100 of the metal complex which are catalyst molecules do not uniformly adhere to the surface of a conductive powder 102, resulting in a state in which the crystals 100 of the metal complex and the conductive powder 102 are simply mixed. Therefore, in the conventional catalyst, the chemical interaction ability between the metal complex in a crystalline state and the conductive powder 102 was not sufficiently exhibited.

On the other hand, in the production method of a catalyst of the present invention, as shown in (b) of FIG. 1, a solvent 51 in which metal complexes 50 can be dissolved is selected, and a conductive powder is dispersed in a solution S of the metal complexes 50. Therefore, molecules of the metal complex 50 can be molecularly and uniformly adsorbed on the surface of a conductive powder 52. As a result, it is possible to produce a catalyst 53 having the conductive powder 52 and the metal complex 50 adsorbed in a layer shape on the surface of the conductive powder 52 ((b) of FIG. 2). It can be said that the catalyst 53 has the conductive powder 52, and a complex layer containing the metal complex 50. The complex layer is uniformly provided on the surface of the conductive powder 52.

As described above, the catalyst 53 is a complex in which the metal complex 50 is adsorbed on the surface of the conductive powder 52. In the catalyst 53, since the metal complex 50 is adsorbed on the surface of the conductive powder 52, the chemical interaction ability between the metal complex 50 and the conductive powder 52 is improved. As a result, the oxygen reduction catalytic ability of the catalyst 53 is dramatically improved as compared to the conventional catalyst produced in the presence of crystals.

As described above, in the production method of a catalyst of the present invention, since the metal complexes which are catalyst molecules are uniformly adsorbed on the surface of the conductive powder, a catalyst having an excellent oxygen reduction catalytic ability can be obtained. In addition, the durability of the obtained catalyst when used for an electrode is also favorable.

Accordingly, there is a possibility that a metal complex, which has not been conventionally applied to use of an oxygen reduction catalyst for a fuel cell, can be applied to the production of a catalyst by selecting a solvent. Therefore, by selecting a solvent capable of dissolving the metal complex, various metal complexes can be applied to the production of a catalyst, and the choice of metal complexes is increased as compared to the conventional art.

(Use)

According to the present invention, it is possible to obtain a catalyst having an excellent oxygen reduction catalytic ability, and excellent durability when used for an electrode. Therefore, it can be suitably utilized for industrial applications that utilize the reduction reaction of oxygen. In particular, it can be suitably applied to electrodes of fuel cells and metal-air batteries, and electrodes for electrochemical reactions.

The catalyst can also be applied to the production of a composition to be described later.

<Catalyst>

The catalyst of the present invention has a complex layer containing a metal complex, and a conductive powder. In addition, the complex layer covers the surface of the conductive powder. The complex layer covers the surface of the conductive powder by molecular adsorption. It can be said that the catalyst of the present invention is a complex in which a complex layer containing a metal complex is adsorbed on the surface of a conductive powder.

In the catalyst of the present invention, since the metal complex is adsorbed on the surface of the conductive powder, the chemical interaction ability between the metal complex and the conductive powder is improved. As a result, the oxygen reduction catalytic ability is dramatically improved as compared to the conventional catalyst produced in the presence of crystals.

The catalyst of the present invention can be obtained by the above-mentioned production method of a catalyst of the present invention, for example. That is, it can be said that the catalyst of the present invention is a catalyst obtained by the production method of a catalyst of the present invention.

The catalyst of the present invention can be applied to the composition described below, for example.

<Production Method of Composition>

A production method of a composition of the present invention includes a step (a) of dissolving a metal complex in a solvent to prepare a solution; a step (b) of dispersing a conductive powder in the solution to prepare a dispersion liquid; and a step (c) of removing the solvent from the dispersion liquid, in which a complex is formed by adsorbing the metal complex on a surface of the conductive powder to use the complex as a catalyst, and the method further includes a step (d) of mixing the catalyst and a liquid medium.

That is, the production method of a composition of the present invention further includes the following step (d) in addition to each of the steps of the above-mentioned production method of a catalyst of the present invention.

Step (d): A step of mixing the catalyst and a liquid medium.

The contents of details and preferred aspects of the step (a), the step (b), and the step (c) can be the same as the contents described in the section <Production method of catalyst> of the present invention described above.

(Step (d))

In the step (d), the catalyst and the liquid medium are mixed. For example, in the step (d), in the composition, the catalyst, the liquid medium and, if necessary, a perfluorocarbon material may be mixed or kneaded.

At the time of mixing or kneading, ultrasonic treatment, a mixer, a blender, a kneader, a homogenizer, a bead mill, a ball mill, or the like may be used. Before and after the kneading operation, the average particle size of particles may be adjusted by using a sieve or the like.

When preparing a composition containing a perfluorocarbon material, the catalyst, the perfluorocarbon material and, if necessary, water and alcohol may be mixed and stirred until they become uniform.

The liquid medium may be an inorganic medium such as water, or may be an organic medium.

Specific examples of the organic medium include alcohols such as methanol, ethanol, propanol, isopropanol (2-propanol), and 1-hexanol; dimethyl sulfoxide; tetrahydrofuran; aprotic polar solvents such as N-methylpyrrolidone, dimethylformamide, and acetone; and non-polar solvents such as chloroform, dichloromethane, 1,4-dioxane, benzene, and toluene. However, the liquid medium is not limited to these examples.

The liquid medium may be the same as or different from the solvent used in the production of the catalyst.

As the liquid medium, one kind may be used alone, or two or more kinds may be used in combination.

At the time of mixing or kneading, optional components other than the catalyst and the liquid medium may be further mixed. Accordingly, it is possible to obtain a composition further containing the optional components other than the catalyst and the liquid medium. For example, as the optional component, a perfluorocarbon material containing a structural unit based on polytetrafluoroethylene and a perfluoro side chain having a sulfonic acid group may be used. When the perfluorocarbon material is used, a composition further containing the perfluorocarbon material is obtained.

Specific examples of the perfluorocarbon material include Nafion (product name: manufactured by DuPont). However, the perfluorocarbon material is not limited to this example.

<Composition>

A composition of the present invention contains the catalyst obtained by the production method of a catalyst of the present invention and a liquid medium. The contents of details of the liquid medium, the catalyst, and the optional components other than the liquid medium are the same as those described in the section <Production method of composition>.

For example, the composition can be used as a coating liquid used in manufacturing of electrodes. That is, the composition is useful as a composition for manufacturing an electrode. Manufacturing of an electrode will be described later in the section <Manufacturing method of electrode>.

The composition may be a dispersion liquid type in which the catalyst is dispersed in the liquid medium, for example.

If necessary, the composition may further contain an auxiliary catalyst, a binder, or the like. The composition can be applied to manufacturing of electrodes, for example.

<Manufacturing Method of Electrode>

A manufacturing method of an electrode of the present invention includes: a step (a) of dissolving a metal complex in a solvent to prepare a solution; a step (b) of dispersing a conductive powder in the solution to prepare a dispersion liquid; and a step (c) of removing the solvent from the dispersion liquid, in which a complex is formed by adsorbing the metal complex on a surface of the conductive powder to use the complex as a catalyst, and the method further includes: a step (d) of mixing the catalyst and a liquid medium; and a step (e) of applying a mixture of the catalyst and the liquid medium to a surface of a base material and removing the liquid medium.

That is, the manufacturing method of an electrode of the present invention further includes the following step (d) and step (e) in addition to each of the steps of the above-mentioned production method of a catalyst of the present invention.

Step (d): A step of mixing the catalyst and a liquid medium.

Step (e): A step of applying a mixture of the catalyst and the liquid medium to a surface of a base material and removing the liquid medium.

The contents of details and preferred aspects of the step (a), the step (b), the step (c), and the step (d) can be the same as the contents described in the section <Production method of catalyst> or the section <Manufacturing method of electrode> of the present invention described above.

It can be said that the mixture of the catalyst and the liquid medium is the composition of the present invention. Therefore, in one aspect of the production method of a catalyst of the present invention, it can be said that the composition obtained by the production method of a composition of the present invention is applied to the surface of the base material, and the above-mentioned liquid medium is removed.

(Step (e))

In the step (e), the composition is applied to the surfaces of various base materials to provide a layer containing the composition on the surface of the base material. Thereafter, the liquid medium is removed from the layer containing the composition. After removing the liquid medium, a catalyst layer containing the catalyst on the surface of the base material is provided.

The thickness when the composition is applied to the surface of the base material is not particularly limited. For example, the composition may be applied to the surface of the base material so that the thickness of the catalyst layer is 0.01 to 100 μm. When the thickness of the catalyst layer is equal to or more than the above-mentioned lower limit value, the durability of an electrode is further improved. When the thickness is equal to or less than the above-mentioned upper limit value, performance of an electrode is unlikely to deteriorate.

When removing the liquid medium, heat-drying may be performed, or pressing may be performed after drying.

Examples of the base material (substrate) include aluminum foil, electrolytic aluminum foil, aluminum mesh (expanded metal), foamed aluminum, punching aluminum, aluminum alloys such as duralumin, copper foil, electrolytic copper foil, copper mesh (expanded metal), foamed copper, punching copper, copper alloys such as brass, brass foil, brass mesh (expanded metal), foamed brass, and punching brass, nickel foil, nickel mesh, corrosion-resistant nickel, nickel mesh (expanded metal), punching nickel, foamed nickel, nickel sponge, metallic zinc, corrosion-resistant metallic zinc, zinc foil, zinc mesh (expanded metal), steel plate, punching steel plate, and silver.

The base material may be a silicon substrate; a metal substrate such as gold, iron, stainless steel, copper, aluminum, and lithium; an alloy substrate containing any combination of these metals; an oxide substrate such as indium tin oxide (ITO), indium zinc oxide (IZO), and antimony tin oxide (ATO); or a substrate having a substrate shape such as a carbon substrate such as glassy carbon, pyrolytic graphite, and carbon felt. However, the base material is not limited to these examples.

By using a substrate having a porous support layer as the base material for example, the electrode obtained by the manufacturing method of the present invention may be utilized as an electrode for a fuel cell. When utilized as an electrode of a fuel cell, the electrode may be used as any of a cathode electrode or an anode electrode.

The porous support layer is a layer that diffuses gas. The porous support layer is not particularly limited as long as it has electron conductivity, high gas diffusibility, and high corrosion resistance. Examples of the porous support layer include carbon-based porous materials such as carbon paper and carbon cloth, stainless steel foil, and aluminum foil coated with a corrosion-resistant material.

The electrode obtained by the manufacturing method of the present invention can be utilized as an electrode of a fuel cell. When utilized as an electrode of a fuel cell, an electrolyte membrane may be disposed between a pair of electrodes.

When the electrode is utilized as an electrode of a fuel cell, a reduction reaction of oxygen represented by Formula (2) is likely to proceed under acidic conditions, and a reduction reaction represented by Formula (3) is likely to proceed under alkaline conditions.

$$O_2 + 4H^+ + 4e^- \rightarrow 2H_2O \qquad (2)$$

$$O_2 + 2H_2O + 4e^- \rightarrow 4OH^- \qquad (3)$$

According to the manufacturing method of an electrode of the present invention, it is possible to manufacture an electrode containing a catalyst having an excellent oxygen reduction catalytic ability and having excellent durability when used for an electrode.

<Electrode>

An electrode of the present invention contains the catalyst of the present invention. That is, the electrode of the present invention contains the catalyst obtained by the production method of a catalyst. The electrode of the present invention can be manufactured by the above-mentioned manufacturing method of an electrode of the present invention, for example.

The electrode can be suitably applied to an electrode for a power storage device (power generation device) such as a fuel cell or a metal-air battery.

<Fuel Cell>

A fuel cell of the present invention has an electrode containing the catalyst of the present invention. The fuel cell has a first electrode, a second electrode, an electrolyte, and a separator, for example. The first electrode is the electrode obtained by the above-mentioned manufacturing method of an electrode of the present invention. The second electrode is an electrode used in combination with the first electrode.

When the first electrode is a cathode, the second electrode is an anode, and when the first electrode is an anode, the second electrode is a cathode.

Examples of the second electrode include single metals such as aluminum and zinc, and metal oxides thereof. However, the second electrode is not limited to these examples.

As the electrolyte, an aqueous electrolytic solution is preferable. Examples of the aqueous electrolytic solution include alkaline aqueous solutions such as a potassium hydroxide aqueous solution and a sodium hydroxide aqueous solution; and acidic aqueous solutions such as a sulfuric acid aqueous solution. As the electrolyte, one kind may be used alone, or two or more kinds may be used in combination. However, the electrolyte is not limited to these examples, and may be an inorganic solid electrolyte.

The separator is a member that separates the first electrode and the second electrode, holds the electrolyte, and secures ionic conductivity between the first electrode and the second electrode.

Specific examples of the separator include polyethylene, polypropylene, polytetrafluoroethylene, polyvinylidene fluoride, cellulose, cellulose acetate, hydroxyalkyl cellulose, carboxymethyl cellulose, polyvinyl alcohol, cellophane, polystyrene, polyacrylonitrile, polyacrylamide, polyvinyl chloride, polyamide, vinylon, polymers having micropores such as poly(meth)acrylic acid, gel compounds, ion-exchange membranes, cyclized polymers, poly(meth)acrylate-containing polymers, sulfonate-containing polymers, quaternary ammonium salt-containing polymers, and quaternary phosphonium salt-containing polymers. However, the separator is not limited to these examples.

The fuel cell may be a primary battery or a secondary battery.

Examples of the fuel cell include metal-air batteries, molten carbonate fuel cells (MCFC), phosphoric acid fuel cells (PAFC), solid oxide fuel cells (SOFC), polymer electrolyte fuel cells (PEFC), enzyme (bio) fuel cells, microbial fuel cells, hydrazine fuel cells, and direct methanol oxidization fuel cells (DMFC). The form of the fuel cell is not limited to these examples, but PEFC and DMFC are preferable.

The fuel cell of the present invention can be manufactured by using the electrode obtained by the above-described manufacturing method of an electrode the present invention when manufacturing the first electrode. Accordingly, it is possible to manufacture a fuel cell having a first electrode containing the catalyst obtained by the production method of the present invention.

The fuel cell of the present invention has an electrode having an excellent oxygen reduction catalytic ability and excellent durability.

A metal-air battery of the present invention has the electrode obtained by the manufacturing method of the present invention. The contents of details of the metal-air battery can be the same as the contents described for the fuel cell described above. The metal-air battery of the present invention can be manufactured basically in the same manner as the manufacturing method of a fuel cell.

EXAMPLES

Hereinafter, the present embodiment will be specifically described with reference to examples, but the present invention is not limited to the following description.

Abbreviation

FeTPP: Iron tetraphenylporphine (synthesized by a method to be described later)
FePc: Iron phthalocyanine ("P0774" manufactured by Tokyo Chemical Industry Co., Ltd.)
DBU: Diazabicycloundecene
DMSO: Dimethyl sulfoxide
DMF: N,N-Dimethylformamide
THF: Tetrahydrofuran
MWCNT: ("755125" manufactured by Sigma Aldrich)
TEM: Transmission Electron Microscope
SEM: Scanning Electron Microscope
XPS: X-ray photoelectron spectroscopy
RRDE: Rotating Ring Disk Electrodes
LSV: Linear Sweep Voltammetry
K-L: Koutecky-Levich
Pt/C: Platinum-supporting carbon (manufactured by Sigma Aldrich, 738549-1G)
GC: Glassy carbon (manufactured by BAS Inc., 01338)

<Measurement Method>

(Solubility)

The solubility of a metal complex in a solvent was measured at 25° C. under atmospheric pressure by using ultraviolet-visible spectroscopy, and the maximum value of the dissolved amount (g) of the metal complex per 1 L of the solvent was used.

(Concentration)

The concentration of the metal complex in a solution was measured using a spectrophotometer ("V-760DS" manufactured by JASCO) for a solution in which the metal complex was dissolved in DMSO. The molar extinction coefficient of FeTPP at the wavelength of 636 nm is 2189.930071 L/(mol/cm).

(Half Wave Potential)

In an LSV curve, a potential when a current value reaches half of a current value when the potential is −0.5 V was defined as a half wave potential.

(Number of Reaction Electrons)

The number of reaction electrons was calculated based on a K-L plot. Current densities of a ring electrode and a disk electrode were calculated from the LSV measurement, and the number of reaction electrons was calculated based on the amount of $H_2O_2$ detected in the ring electrode based on the RRDE.

(Amount of Supported Catalyst)

The measurement was performed using an X-ray photoelectron spectroscopy analyzer (manufactured by Thermo Fisher Scientific, Theta Probe).

(TEM)

An observation image was obtained by a transmission electron microscope (H-7650, manufactured by Hitachi, Ltd.).

(SEM)

An observation image was obtained by a scanning transmission electron microscope (S-5200, manufactured by Hitachi, Ltd.).

(Cyclic Voltammogram)

A cyclic voltammogram was measured by a CompactStat (manufactured by Ivium Technologies B.V., NH-COMPACT).

A solution, in which hydroxymethylferrocene was added to a 0.1 M potassium chloride aqueous solution so that the concentration of hydroxymethylferrocene was 1 mM, was used as an electrolytic solution, a platinum plate was used as a counter electrode, and Ag/AgCl was used as a reference electrode.

(LSV Curve)

LSV curves were acquired using an oxygen-saturated 0.1 M potassium hydroxide aqueous solution as an electrolytic solution under the condition of the sweep speed of 5 mV/s by a rotating ring disk electrode (manufactured by BAS Inc., RRDE-3A) with the lower limit of −0.8 V and the upper limit of 0.2 V as the sweep range. The rotation speed of the rotating disk was 2400 rpm, Pt wire was used as a counter electrode, and Ag/AgCl was used as a reference electrode.

(LSV Measurement by RRDE)

LSV measurement by RRDE was performed using an oxygen-saturated 0.1 M potassium hydroxide aqueous solution as an electrolytic solution under the condition of the sweep speed of 5 mV/s by a rotating ring disk electrode (manufactured by BAS Inc., RRDE-3A). The LSV was measured when the rotation speed of the rotating disk was set to each of the rotation speeds of 0 rpm, 400 rpm, 800 rpm, 1200 rpm, 1600 rpm, 2000 rpm, and 2400 rpm. Pt was used as a counter electrode, and Ag/AgCl was used as a reference electrode.

In the graph showing the result of the LSV measurement by the RRDE, when the applied potential shown on the horizontal axis when generation of the current shown on the vertical axis starts becomes higher, this means that the oxygen reduction catalytic ability becomes excellent.

Example 1

Pyridine-2,3-dicarbonitrile: 258 mg, iron(III) chloride hexahydrate: 135 mg, and DBU: 20 mg were mixed in a test tube and dissolved in a mixed solvent containing methanol: 10 mL and DMSO: 10 mL. Subsequently, while substituting with nitrogen, the mixture was heated at 180° C. for 3 hours to obtain a reaction product containing FeTPP. The reaction product was centrifuged 3 times with acetone and dried. The precipitate after the centrifugation was dissolved in concentrated sulfuric acid and added dropwise to water to precipitate FeTPP. The precipitated FeTPP was recovered by centrifugation and washed with methanol to obtain FeTPP.

Subsequently, the obtained FeTPP: 0.1 mg was dissolved in DMSO: 1.0 mL to prepare a solution in which the concentration of FeTPP was 0.1 g/L. MWCNT: 5 mg (diameter: 9.5 nm, length: 1.5 μm) having a carboxyl group was dispersed in the obtained solution. At the time of dispersion, ultrasonic treatment (20 kHz) was performed for 15 minutes. DMSO that is a solvent was removed from the obtained dispersion liquid by solid-liquid separation and methanol washing, and drying was performed at room temperature for 24 hours to obtain a catalyst of Example 1.

Subsequently, the obtained catalyst of Example 1: 0.82 mg, Milli-Q water: 84 μL, isopropyl alcohol: 336 μL, and a 0.5% by mass Nafion aqueous solution: 6 μL were kneaded with an ultrasonic stirrer and applied to a GC electrode to obtain an electrode of Example 1.

Comparative Example 1

In Comparative Example 1, a catalyst was produced in the same manner as in Example 1 except that the obtained FeTPP was dissolved in THF. Subsequently, an electrode containing the catalyst of Comparative Example 1 was manufactured in the same manner as in Example 1.

Comparative Example 2

In Comparative Example 2, a catalyst was produced in the same manner as in Example 1 except that FePc was used instead of FeTPP, and FePc was dissolved in THF. Subsequently, an electrode containing the catalyst of Comparative Example 2 was manufactured in the same manner as in Example 1.

Comparative Example 3

In Comparative Example 3, an electrode (Pt/C electrode) of Comparative Example 3 was manufactured in the same manner as in Example 1 except that Pt/C was used instead of the catalyst of Example 1.

Comparative Example 4

In Comparative Example 4, a dispersion liquid of MWCNT was prepared without using FeTPP. An electrode of Comparative Example 4 was manufactured in the same manner as in Example 1 except that the obtained dispersion liquid of MWCNT was used.

FIG. 3 is a photograph showing a solution used in Example 1 in which FeTPP was dissolved in DMSO. As shown in FIG. 3, the solution was transparent. In addition, because this solution was blue, it was confirmed that FeTPP was dissolved in DMSO.

Figure 4:
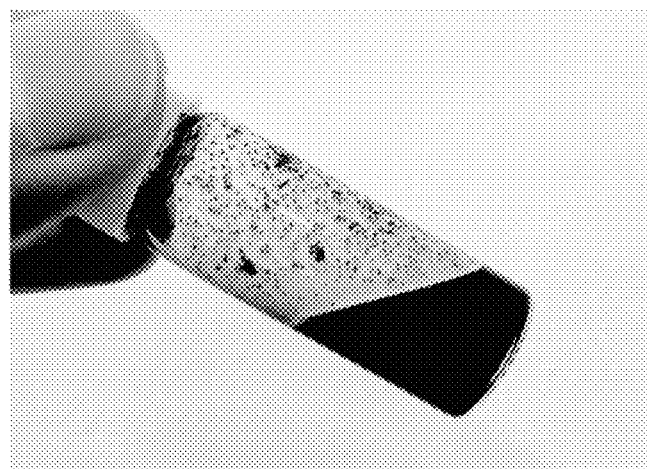
FIG. 4 is a photograph showing a dispersion liquid in which MWCNT was dispersed in the solution in which FeTPP was dissolved in DMSO in Example 1.

FIG. 4 is a photograph showing a dispersion liquid in which MWCNT was dispersed in the solution in which FeTPP was dissolved in DMSO in Example 1. Since the entire liquid was uniformly black and turbid, it was confirmed that the liquid was in a uniformly dispersed state.

Figure 5:
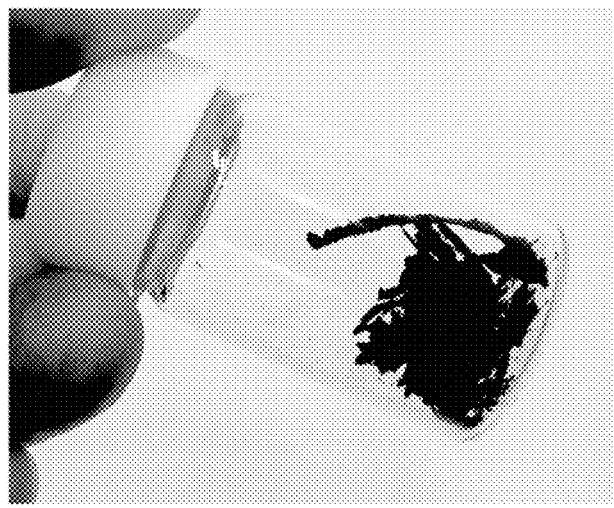
FIG. 5 is a photograph showing a catalyst obtained in Example 1.
Figure 6:
FIG. 6 is a photograph showing the catalyst obtained in Example 1.

FIG. 5 and FIG. 6 are photographs showing the catalyst obtained in Example 1. As shown in FIGS. 5 and 6, it was confirmed that the catalyst could be produced on a gram scale. From these results, the present invention can be industrially utilized.

Figure 7:
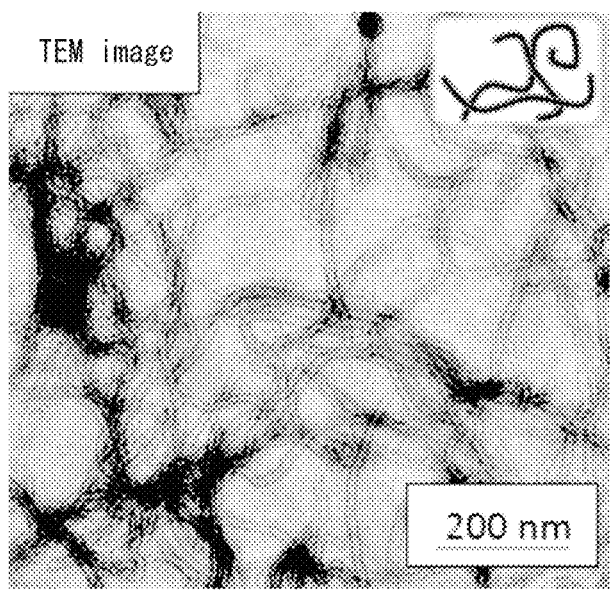
FIG. 7 is an observation image of the catalyst of Example 1 by TEM.

FIG. 7 is an observation image of the catalyst of Example 1 by TEM. In FIG. 7, a crystal structure as confirmed in FIG. 8 to be described later was not confirmed. Separately by XPS, it was confirmed that iron atoms were present on the surface of the catalyst of Example 1. From these results, it was suggested that a complex layer of FeTPP was molecularly adsorbed on the surface of MWCNT.

Figure 8:
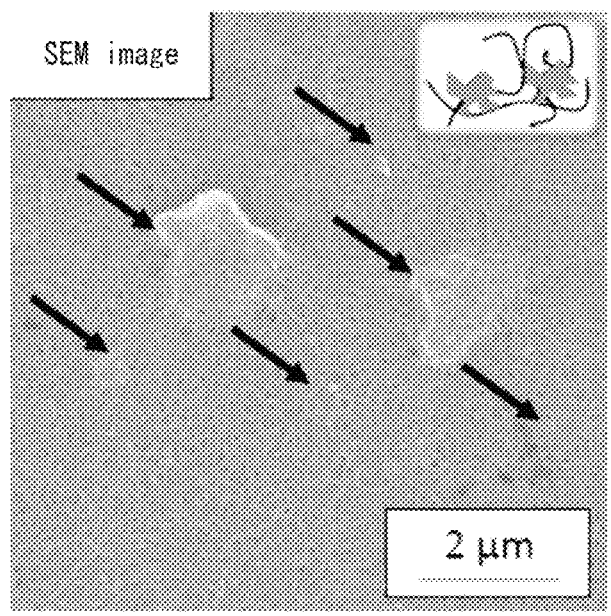
FIG. 8 is an observation image of a catalyst of Comparative Example 1 by SEM.

FIG. 8 is an observation image of the catalyst of Comparative Example 1 by SEM. In FIG. 8, as shown by arrows, a large number of crystal structures having different sizes were confirmed. These crystal structures were derived from crystals of FeTPP that were not dissolved in THF.

Figure 9:
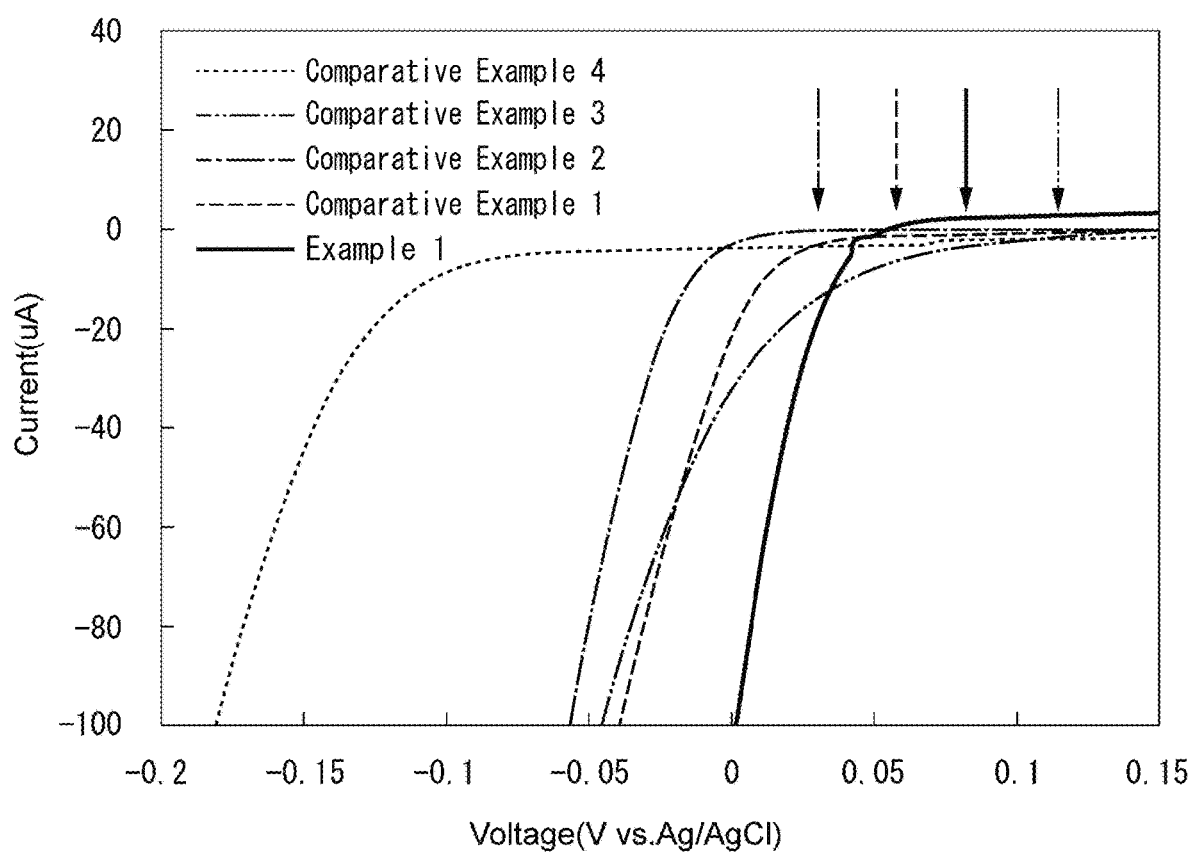
FIG. 9 is a graph showing a comparison of oxygen reduction characteristics from measurement results of LSV at 1600 rpm for each of electrodes of Example 1 and Comparative Examples 1 to 4.

FIG. 9 is a graph showing a comparison of oxygen reduction characteristics from measurement results of LSV at 1600 rpm for each of electrodes of Example 1 and Comparative Examples 1 to 4. In the graph showing the result of the LSV measurement by the RRDE, when the potential of the horizontal axis when generation of the current shown on the vertical axis starts becomes higher, this means that energy loss becomes less and the oxygen reduction catalytic ability becomes excellent.

As shown in FIG. 9, in the LSV curve of Example 1, a current is rapidly generated in the section of the potential 0 to 0.05 on the horizontal axis. From this result, it was confirmed that the electrode of Example 1 has an excellent oxygen reduction catalytic ability as compared to each of the electrodes of Comparative Examples 1 to 4.

Figure 10:
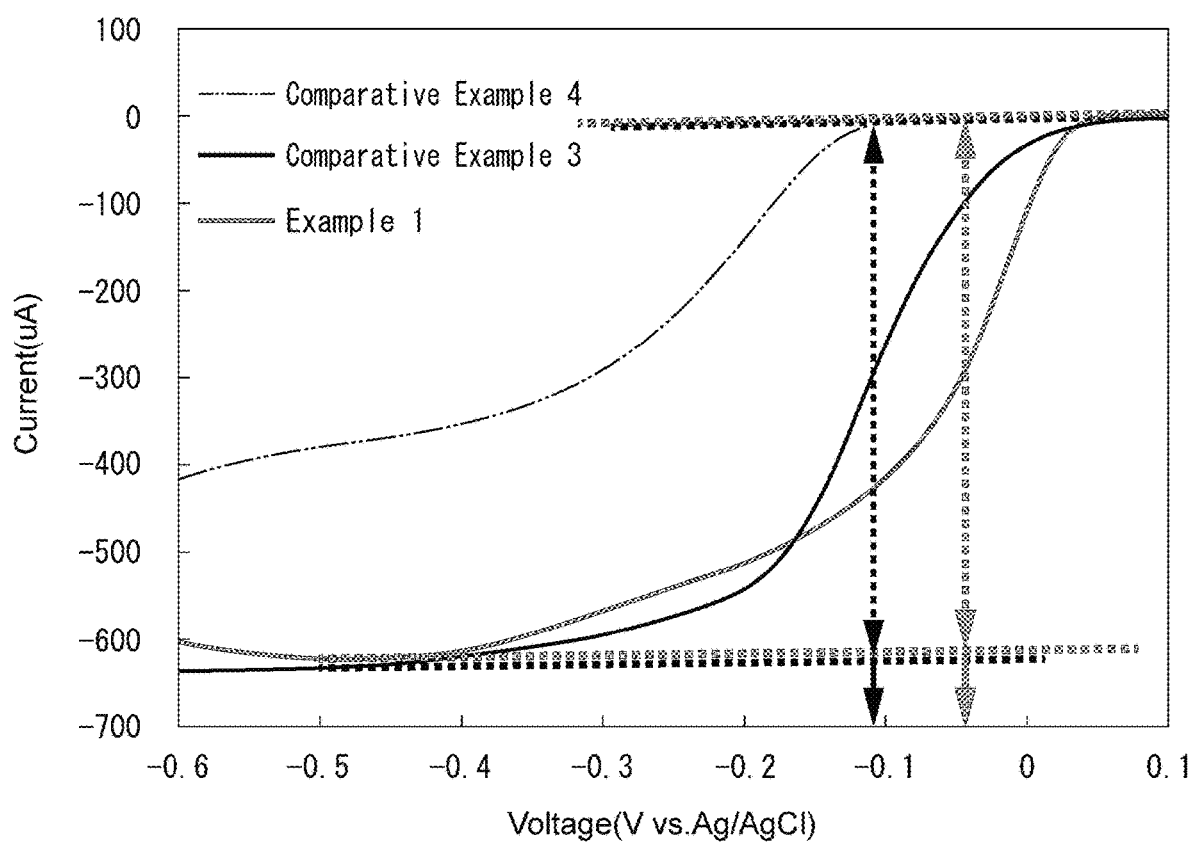
FIG. 10 is a graph showing a comparison of oxygen reduction characteristics from measurement results of LSV at 1600 rpm in Example 1 and Comparative Examples 3 and 4.

FIG. 10 is a graph showing a comparison of oxygen reduction characteristics from measurement results of LSV at 1600 rpm in Example 1 and Comparative Examples 3 and 4. From the results of FIG. 9 and FIG. 10, the half wave potential of each of the electrodes was obtained. Table 2 shows the results of measuring the number of reaction electrons together with the half wave potential.

TABLE 2

| | Reaction start potential [V] | Half wave potential [V] | Number of reaction electrons | Amount of supported catalyst [% by mass] |
|---|---|---|---|---|
| Example 1 | 0.075 | −0.050 | 3.95 | 5 |
| Comparative Example 1 | 0.030 | −0.063 | 3.99 | 50 |
| Comparative Example 2 | 0.010 | −0.087 | — | 50 |
| Comparative Example 3 | 0.10 | −0.114 | 3.89 | 20 |
| Comparative Example 4 | −0.075 | −0.23 | — | — |

As shown in Table 2, in the electrode of Example 1, the amount of the supported catalyst is smaller as compared to that of Comparative Examples 1 to 4. Nonetheless, the electrode of Example 1 showed excellent oxygen reduction reaction characteristics, and it was found that it has an excellent oxygen reduction catalytic ability. From the measurement results of the half wave potential and the number of reaction electrons shown in Table 2, it could be confirmed that the oxygen reduction catalytic ability of the electrode of Example 1 was superior to the oxygen reduction catalytic ability of the Pt/C electrode of Comparative Example 3.

Figure 11:
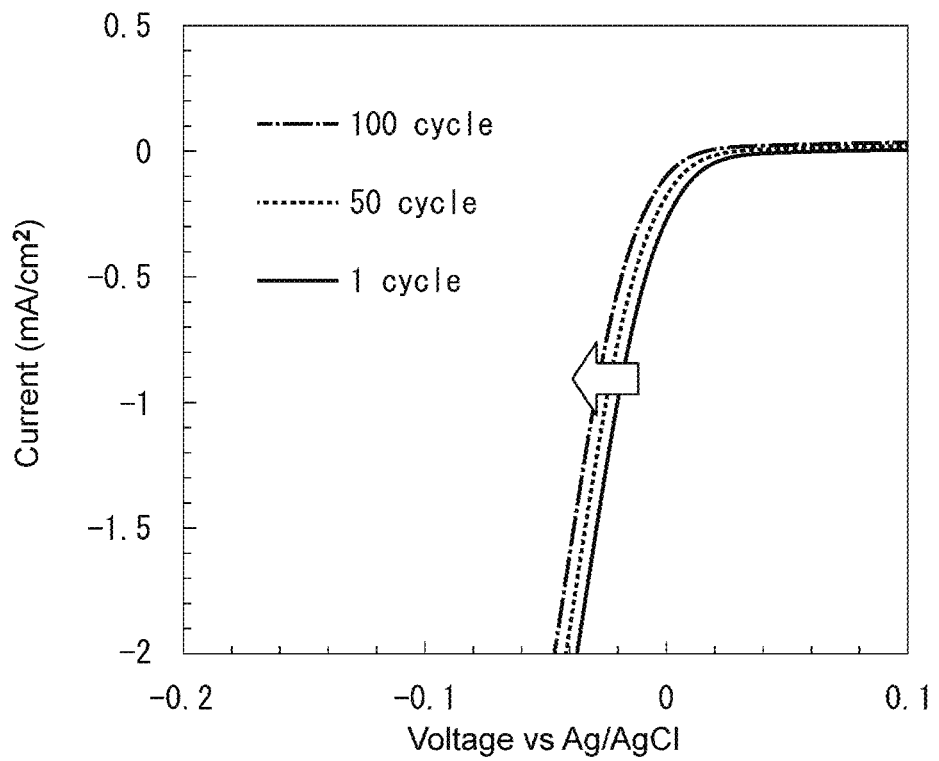
FIG. 11 is a graph showing a comparison of LSV curves when a cyclic voltammogram is performed for one cycle, 50 cycles, and 100 cycles using the electrode of Example 1.

FIG. 11 is a graph showing a comparison of LSV curves when a cyclic voltammogram is performed for one cycle, 50 cycles, and 100 cycles using the electrode of Example 1.

As shown in FIG. 11, in Example 1, even when the number of cycles increased to 1, 50, 100, there was almost no change in the potential on the horizontal axis when the current shown on the vertical axis started to be generated.

Figure 12:
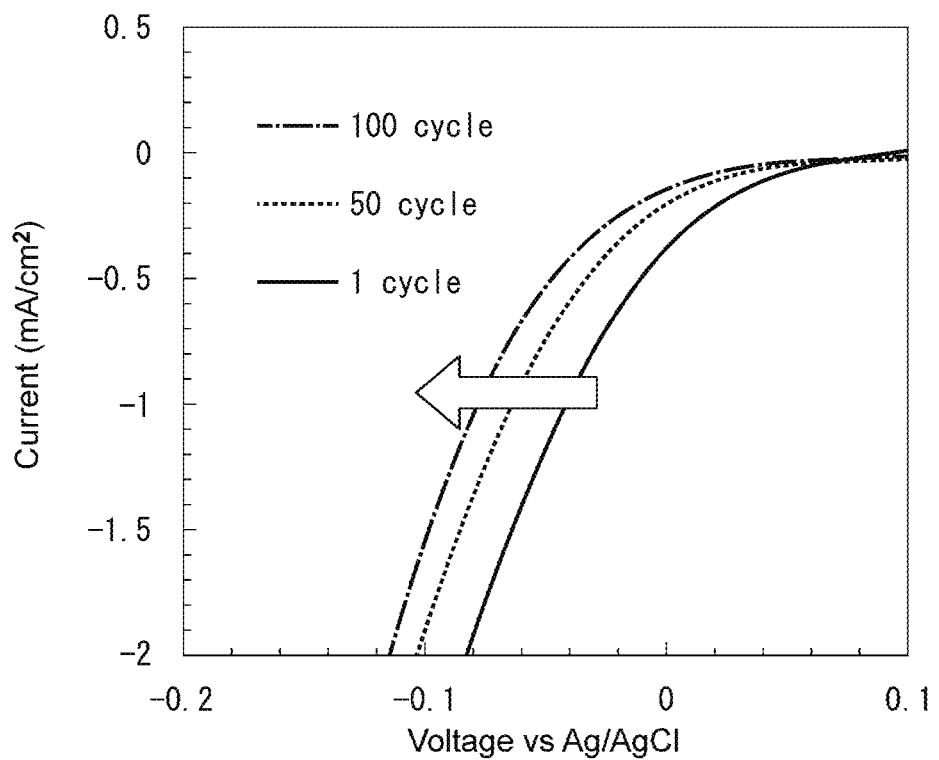
FIG. 12 is a graph showing a comparison of LSV curves when a cyclic voltammogram is performed for one cycle, 50 cycles, and 100 cycles using the Pt/C electrode of Comparative Example 3.

FIG. 12 is a graph showing a comparison of LSV curves when a cyclic voltammogram is performed for one cycle, 50 cycles, and 100 cycles using the Pt/C electrode of Comparative Example 3.

As shown in FIG. 12, in the Pt/C electrode of Comparative Example 3, as the number of cycles increased to 1, 50, and 100, the potential on the horizontal axis when the current on the vertical axis started to be generated decreased.

From the results shown in FIG. 11 and FIG. 12, it was confirmed that the electrode of Example 1 also had durability superior to that of the Pt/C electrode.

From the results of the present example described above, it was confirmed that the catalyst having an excellent oxygen reduction catalytic ability could be produced by using the solution in which the metal complex (1) was dissolved in the solvent.

In addition, it could be confirmed that, even when the metal complex is dissolved in the solvent, the catalyst having excellent durability when used for an electrode of a fuel cell can be produced.

REFERENCE SIGNS LIST

50: Metal complex, 51: Solvent, 52: Conductive powder, 53: Catalyst, 100: Crystal of metal complex, 101: Liquid medium, 102: Conductive powder, 103: Catalyst, S: Solution, P: Dispersion liquid.

What is claimed is:

1. A production method of a catalyst, the method comprising:

a step (a) of dissolving a metal complex in a solvent to prepare a solution;

a step (b) of dispersing a conductive powder in the solution to prepare a dispersion liquid; and a step (c) of removing the solvent from the dispersion liquid, wherein a complex is formed by adsorbing the metal complex on a surface of the conductive powder to use the complex as a catalyst, and wherein the metal complex is a metal complex represented by Formula (11), Formula (11)

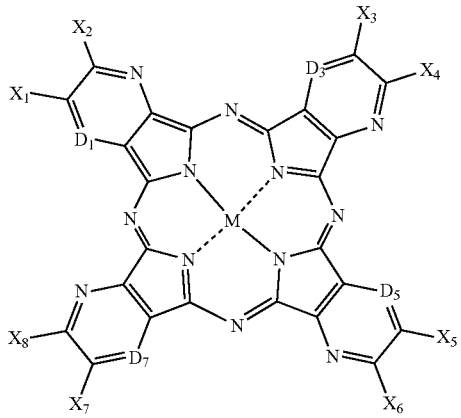

in Formula (11), $X_1$ to $X_8$ are each independently a hydrogen atom or a halogen atom, $D_1$, $D_3$, $D_5$, and $D_7$ are each independently a nitrogen atom or a carbon atom, at least one of $D_1$, $D_3$, $D_5$, and $D_7$ is a carbon atom, a hydrogen atom or a halogen atom is bonded to the carbon atom, and M is a metal atom.

2. The production method of a catalyst according to claim 1, wherein a concentration of the metal complex in the solution is 0.0001 to 5 g/L.

3. The production method of a catalyst according to claim 1, wherein the complex is used as a catalyst without being subjected to heat treatment at 200° C. or higher.

4. The production method of a catalyst according to claim 1, wherein the step (a) and the step (b) are performed at a temperature equal to or lower than a boiling point of the solvent.

5. The production method of a catalyst according to claim 1, wherein the step (a) and the step (b) are performed at a temperature equal to or lower than 80° C.

6. The production method of a catalyst according to claim 1, wherein the metal complex is adsorbed on the surface of the conductive powder at a temperature equal to or lower than a boiling point of the solvent.

7. The production method of a catalyst according to claim 1, wherein the solvent is removed by filtering the dispersion liquid.

8. The production method of a catalyst according to claim 7, wherein an absorbance of a filtrate after filtration is reduced by 10% or more as compared to that of the solution.

9. The production method of a catalyst according to claim 1, wherein a solubility of the metal complex in the solvent is 0.1 g/L or more.

10. The production method of a catalyst according to claim 1, wherein a solubility parameter of the solvent is 10 to 20 $(MPa)^{1/2}$.

11. The production method of a catalyst according to claim 1, wherein the solvent is at least one selected from the group consisting of dimethyl sulfoxide and N,N-dimethylformamide.

12. The production method of a catalyst according to claim 1, wherein the conductive powder is at least one selected from the group consisting of a carbon material, a metal material, and a metal oxide material.

13. A catalyst which is obtained by the production method of a catalyst according to claim 1.

14. A composition comprising:
the catalyst obtained by the production method of a catalyst according to claim 1; and
a liquid medium.

15. An electrode comprising the catalyst obtained by the production method of a catalyst according to claim 1.

16. A fuel cell comprising the electrode according to claim 15.

17. A metal-air battery comprising the electrode according to claim 15.

18. A production method of a composition, the method comprising:
a step (a) of dissolving a metal complex in a solvent to prepare a solution;
a step (b) of dispersing a conductive powder in the solution to prepare a dispersion liquid; and
a step (c) of removing the solvent from the dispersion liquid, wherein a complex is formed by adsorbing the metal complex on a surface of the conductive powder to use the complex as a catalyst, and
the method further comprises a step (d) of mixing the catalyst and a liquid medium;
wherein the metal complex is a metal complex represented by Formula (11), Formula (11)

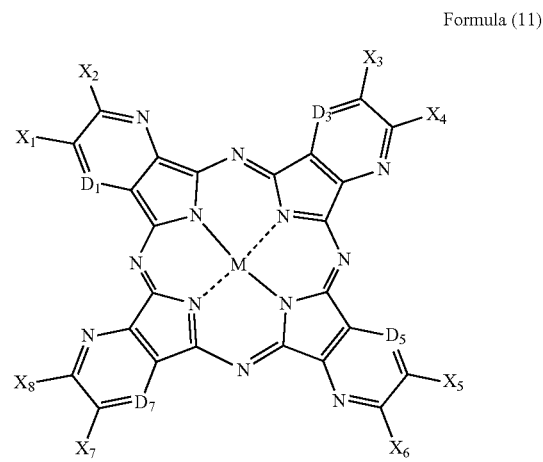

in Formula (11), $X_1$ to $X_8$ are each independently a hydrogen atom or a halogen atom, $D_1$, $D_3$, $D_5$, and $D_7$ are each independently a nitrogen atom or a carbon atom, at least one of $D_1$, $D_3$, $D_5$, and $D_7$ is a carbon atom, a hydrogen atom or a halogen atom is bonded to the carbon atom, and M is a metal atom.

19. A manufacturing method of an electrode, the method comprising:
a step (a) of dissolving a metal complex in a solvent to prepare a solution;
a step (b) of dispersing a conductive powder in the solution to prepare a dispersion liquid; and
a step (c) of removing the solvent from the dispersion liquid,
wherein a complex is formed by adsorbing the metal complex on a surface of the conductive powder to use the complex as a catalyst, and
the method further comprises:
a step (d) of mixing the catalyst and a liquid medium; and
a step (e) of applying a mixture of the catalyst and the liquid medium to a surface of a base material and removing the liquid medium;

wherein the metal complex is a metal complex represented by Formula (11),
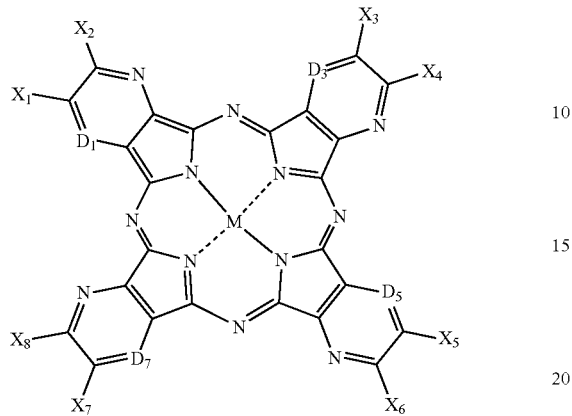
Formula (11)
in Formula (11), $X_1$ to $X_8$ are each independently a hydrogen atom or a halogen atom, $D_1$, $D_3$, $D_5$, and $D_7$ are each independently a nitrogen atom or a carbon atom, at least one of $D_1$, $D_3$, $D_5$, and $D_7$ is a carbon atom, a hydrogen atom or a halogen atom is bonded to the carbon atom, and M is a metal atom.
* * * * *